(12) United States Patent
Benskin et al.

(10) Patent No.: US 11,822,911 B1
(45) Date of Patent: *Nov. 21, 2023

(54) UNIVERSAL INSTALLER AND UNINSTALLER

(71) Applicant: Wells Fargo Bank, N.A., San Francisco, CA (US)

(72) Inventors: Ryan B. Benskin, Charlotte, NC (US); Jonathan D. Russell, Charlotte, NC (US); Lawrence T. Belton, Jr., Charlotte, NC (US); Peter A. Makohon, Huntersville, NC (US); Timothy H. Morris, Lexington, NC (US); Jeremy B. Hairston, Sr., Charlotte, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/898,957

(22) Filed: Jun. 11, 2020

Related U.S. Application Data (63) Continuation of application No. 15/288,319, filed on Oct. 7, 2016, now Pat. No. 10,698,672.

(51) Int. Cl.
 *G06F 9/455* (2018.01)
 *G06F 8/61* (2018.01)

(52) U.S. Cl.
 CPC . *G06F 8/61* (2013.01); *G06F 8/62* (2013.01)

(58) Field of Classification Search
 CPC .................................. G06F 8/61; G06F 8/62
 See application file for complete search history.

(56) References Cited

U.S. PATENT DOCUMENTS

| | | | | |
|---|---|---|---|---|
| 5,768,566 A | * | 6/1998 | Harikrishnan | ............ G06F 8/62 717/170 |
| 5,946,677 A | * | 8/1999 | Bullen | .................... G06F 16/10 707/700 |
| 6,374,401 B1 | | 4/2002 | Curtis | |
| 6,631,521 B1 | | 10/2003 | Curtis | |
| 6,981,252 B1 | | 12/2005 | Sadowsky | |
| 7,665,084 B2 | | 2/2010 | Suzuki et al. | |
| 7,802,246 B1 | * | 9/2010 | Kennedy | .................. G06F 8/61 717/173 |
| 8,079,085 B1 | | 12/2011 | Wu et al. | |
| 8,099,784 B1 | | 1/2012 | Chen et al. | |

(Continued)

OTHER PUBLICATIONS

Spector et al., "Clean up What a Messy Uninstall Leaves Behind", PCWorld, Science Index, Available Online at: https://www.pcworld.com/article/117824/article.html, Sep. 29, 2004, 3 pages.

*Primary Examiner* — Hang Pan
(74) *Attorney, Agent, or Firm* — Kilpatrick Townsend & Stockton LLP (57) ABSTRACT

Provided are a universal software installer and/or uninstaller. The universal software installer determines a structure of the software to be installed and verifies all necessary software elements are applied or installed on the endpoint during the install. The universal software uninstaller determines a structure of the software to be uninstalled and verifies all related software elements are removed from the endpoint. The universal software installer and/or uninstaller is independent of an operating system platform executing on the endpoint.

16 Claims, 8 Drawing Sheets

(56) References Cited

U.S. PATENT DOCUMENTS

| | | |
|---|---|---|
| 8,239,287 B1 | 8/2012 | Smith et al. |
| 8,407,683 B2 | 3/2013 | Cheng et al. |
| 8,527,982 B1 | 9/2013 | Sapuntzakis et al. |
| 8,528,087 B2 | 9/2013 | Hsu et al. |
| 8,719,924 B1 | 5/2014 | Williamson et al. |
| 8,739,283 B1 | 5/2014 | Zhang et al. |
| 9,152,791 B1 | 10/2015 | Shih et al. |
| 10,380,339 B1 | 8/2019 | Appalaraju et al. |
| 10,698,672 B1 | 6/2020 | Benskin et al. |
| 2002/0042911 A1 | 4/2002 | Harms |
| 2002/0103973 A1 | 8/2002 | Zimniewicz et al. |
| 2004/0060045 A1* | 3/2004 | Hind ................ G06F 8/62 717/174 |
| 2005/0155031 A1* | 7/2005 | Wang ............ G06F 9/44505 717/170 |
| 2005/0278694 A1 | 12/2005 | Butler et al. |
| 2006/0095925 A1* | 5/2006 | Roth ............. G06F 9/44505 719/331 |
| 2007/0169111 A1* | 7/2007 | Block .................. G06F 8/63 717/174 |
| 2010/0248709 A1 | 9/2010 | Chmaytelli et al. |
| 2010/0256988 A1 | 10/2010 | Barnhill et al. |
| 2010/0275252 A1 | 10/2010 | Yun |
| 2011/0041124 A1 | 2/2011 | Fishman et al. |
| 2011/0093847 A1 | 4/2011 | Shah |
| 2011/0246936 A1 | 10/2011 | Stahlberg |
| 2012/0017276 A1 | 1/2012 | Baskar |
| 2012/0036552 A1 | 2/2012 | Dare et al. |
| 2012/0117127 A1* | 5/2012 | MacDonald ........... G06F 8/62 707/822 |
| 2012/0297063 A1* | 11/2012 | Capomassi ........ G06Q 30/0601 709/224 |
| 2013/0239214 A1 | 9/2013 | Klein et al. |
| 2013/0247193 A1* | 9/2013 | Zaitsev ............... G06F 21/552 726/23 |
| 2014/0337862 A1 | 11/2014 | Valencia et al. |
| 2015/0007316 A1 | 1/2015 | Ben-Shalom et al. |
| 2015/0032887 A1 | 1/2015 | Pesek et al. |
| 2015/0040246 A1 | 2/2015 | Yuen et al. |
| 2016/0026449 A1* | 1/2016 | Gierlak ................ G06F 8/61 717/175 |
| 2016/0098560 A1* | 4/2016 | Friedrichs ........... G06F 21/562 726/23 |
| 2016/0162270 A1 | 6/2016 | Kumar |

\* cited by examiner

UNIVERSAL INSTALLER AND UNINSTALLER

CROSS REFERENCE TO RELATED APPLICATIONS

This application is a continuation of U.S. patent application Ser. No. 15/288,319, filed Oct. 7, 2016, and entitled "UNIVERSAL INSTALLER AND UNINSTALLER," the entirety of which is incorporated herein.

BACKGROUND

A computer system includes various hardware components and software components, including an operating system, hardware drivers, and software drivers. The computer system may also include application software that is preloaded or that is installed during use of the computer system. The application software may be commonly used software items, such as word processing documents, or may be application software that is useful for a limited amount of time (e.g., a gaming application). Although many software installations include an uninstall feature, this feature may remove most, but not all, software components, and, therefore, do not provide a "clean" uninstall. The remaining software components or residual components of the application software may remain installed, although their use is no longer necessary. These remaining traces of the application software may result in loss of valuable memory space as well as other undesired consequences (e.g., slow performance, computer viruses, and so on).

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Various aspects provided herein are related to a universal software installer and/or uninstaller. An aspect relates to a processor coupled to a memory that include instructions that when executed by the processor cause the processor to search for an artifact of a software product that remains on an endpoint after execution of a first uninstall process, wherein the search is informed by a probabilistic or statistic-based inference, and remove the artifact associated with the software product during an uninstall process. The instructions can further cause the processor to search the endpoint based on a profile of at least one of the endpoint or software product. The artifacts can include an empty file folder, a file, registry key, or environmental variable, among other things. The instructions can also cause the processor to update a profile of at least one of the endpoint or the software product with the artifact and identify the software product based on received user input. Further, the processor can employ a machine learning classifier to compute a probability the artifact resulted from the software product and trigger removal of the artifact if the probability exceeds a threshold.

Another aspect relates to a method that comprises searching an endpoint for an artifact of a software product that remains on the endpoint after execution of an initial uninstall process to remove the software product from an endpoint, wherein the searching is informed by probabilistic or statistic-based inference, and removing the artifact of the software product from the endpoint. The method further comprises searching the endpoint based on a profile associated with at least one of the software product or the endpoint. The method can further remove an artifact comprising a file, a file folder or registry key from the endpoint, and update a profile associated with the software product or endpoint with a located artifact. The method can further employ a machine learning classifier to compute a probability that the artifact resulted from the software product and remove the artifact if the probability is greater than a threshold value. Further, the method can search for a second artifact based on identification of a first artifact.

A further aspect relates to a computer-readable storage device that stores executable instructions that, in response to execution by a processor, cause the processor to perform operation comprising searching an endpoint for an artifact of a software product that remains on the endpoint after execution of an initial uninstall process to remove the software product from an endpoint, wherein the searching is informed by probabilistic or statistic-based inference, and removing the artifact of the software product from the endpoint. The artifact can comprise a file, a file folder or registry key, among other things. The operations can further comprise searching for the artifact based on a profile associated with at least one of the endpoint and the software product. Further, the operations can comprise updating a profile associated with at least one of the software product or endpoint with the artifact.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

Various aspects described herein relate to a universal software installer and/or uninstaller. The universal software installer determines a structure of the software to be installed and verifies all necessary software elements are applied or installed on the endpoint during the install. The universal software uninstaller determines a structure of the software to be uninstalled and verifies all related software elements are removed from the endpoint. The universal software installer and/or uninstaller are independent of an operating system platform executing on the endpoint (e.g., operating system agnostic). It is noted that although various aspects may be discussed with a universal software installer separately from a universal software uninstaller, according to various aspects, the install/uninstall may be performed by a single component.

The various aspects discussed herein help to ensure that a software installation is successful and includes all necessary software elements. Further, the various aspects discussed herein alleviate the time needed to uninstall an existing software installation on various endpoint platforms. For example, with the aspects described herein, there is no longer a need to create specific automations to remove difficult software installations. Further, the aspects may aide the novice that needs to remove a particular software from their personal workstation (e.g., endpoint).

In traditional systems, a manual uninstall or script is a normal course for removing installed software. These traditional systems require intimate knowledge of the software product being uninstalled. The aspects provided herein uninstall any software based on partial or full product name or relevant tagging information and, further, prior knowledge of the software product is not necessary.

Figure 1:
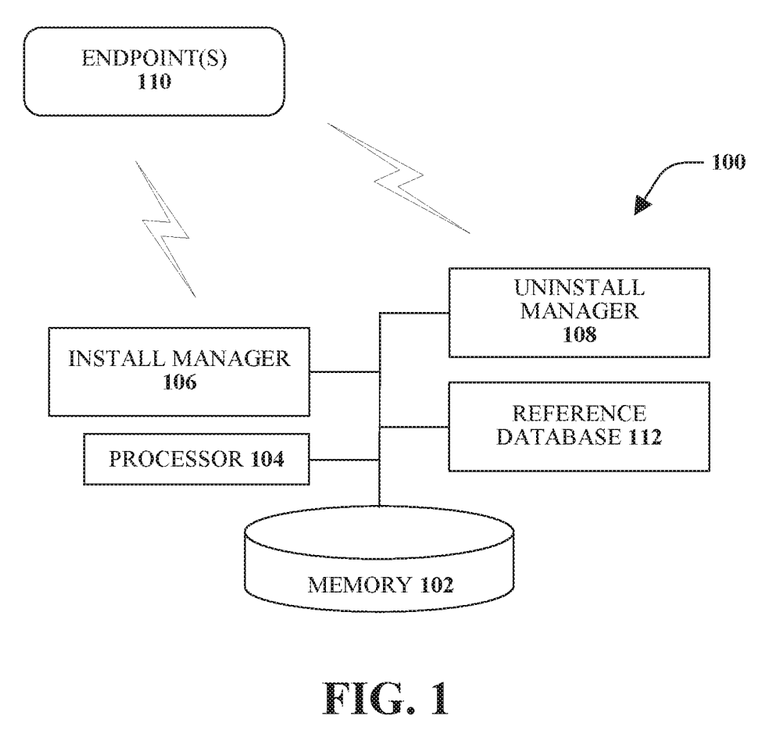
FIG. 1 illustrates an example, non-limiting system configured for universal install/uninstall, according to an aspect.

Referring now to FIG. 1, illustrated is an example, non-limiting system 100 configured for universal install/uninstall, according to an aspect. The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the at least one memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 102 (e.g., operatively connected to the at least one memory 102), the various aspects are not limited to this implementation. Instead, in accordance with various implementations, the one or more computer executable components and/or the one or more computer executable instructions may be stored in (or integrated within) the at least one memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

The system 100 may also include an install manager 106 and an uninstall manager 108. The install manager 106 may be configured to receive a request to perform a software installation on an endpoint 110. The endpoint 110 may be located remote from the system 100, wherein the system 100 communicates with the endpoint over a wireless link or over a wired link. Further, although discussed with respect to a single endpoint 110, more than one endpoint may be utilized with the disclosed aspects. Two or more of the endpoints may operate using a same operating system or different operating systems.

Based on the received request, the install manager 106 may be configured to access a reference database 112. The reference database 112 includes all known installs and uninstalls. Thus, all the different products known that exist, as well as the artifacts required to remove those products from workstations (e.g., endpoints) are included in the reference database 112.

The reference database 112 may contain information related to a multitude of software that may be installed on the endpoint 110 (and other endpoints) and software elements utilized by the software. According to some implementations, the reference database 112 may include information related to a file structure, a registry structure, or other information related to the software. Based on the information obtained from the reference database 112, the install manager 106 may install the requested software on the endpoint 110.

The information related to the various software products may be retained in the reference database 112 associated with the system 100, in the memory 102, or in another system 100 component. According to some implementations, the information related to the various software products may be retained external to the system 100, wherein the system 100 accesses the external source as needed.

In an additional or alternative implementation, the uninstall manager 108 may receive a request to uninstall one or more software applications from the endpoint 110. Based on the request, the uninstall manager 108 may access the reference database 112 to determine information related to the software, including a file structure and/or a registry structure. Based on this information, the uninstall manager 108 may uninstall the software and perform a confirmation to ensure that all software elements have been uninstalled from the endpoint 110, resulting in a "clean" uninstall. As utilized herein, a clean uninstall refers to an uninstallation of software that does not leave software artifacts residing on the endpoint.

According to an implementation, each time a request is received to install and/or uninstall a software product, the system 100 is configured to not only locally determine what may be gathered from the endpoint 110, but the system 100 also reaches out to the reference database 112 to obtain other information. As new information is determined (e.g., software product, artifacts, file registry, and so on), the reference database 112 is updated with the information. Thus, the reference database 112 is a growing entity and may be utilized with multiple endpoints.

According to an implementation, the various aspects may be configured to take a snapshot of all software initially installed on an endpoint using, for example, a software agent on the endpoint. A cloud database of software installation configurations valid for endpoints may be queried. According to some implementations, the cloud database may include the reference database 112. The cloud database may be queried based on a baseline installation policy. Further, the endpoint may be continuously monitored. If the agent detects software components on the endpoint that are not included in the cloud database, an uninstall for the software components may be triggered. Installation paths in the endpoint may be identified. Further, the primary executable and file structure for the software components may be located. An uninstall hive may be scanned for a static reference to an uninstall string for the software components. An uninstall string may be executed. Further, references to the installation paths for the software components in the registry may be scanned. Those paths may be validated in the hierarchy of program files for the software components. The validated paths and program files may be removed. In addition, any reference registry keys for the software installation may be removed, regardless of whether the uninstall string is successfully executed.

Figure 2:
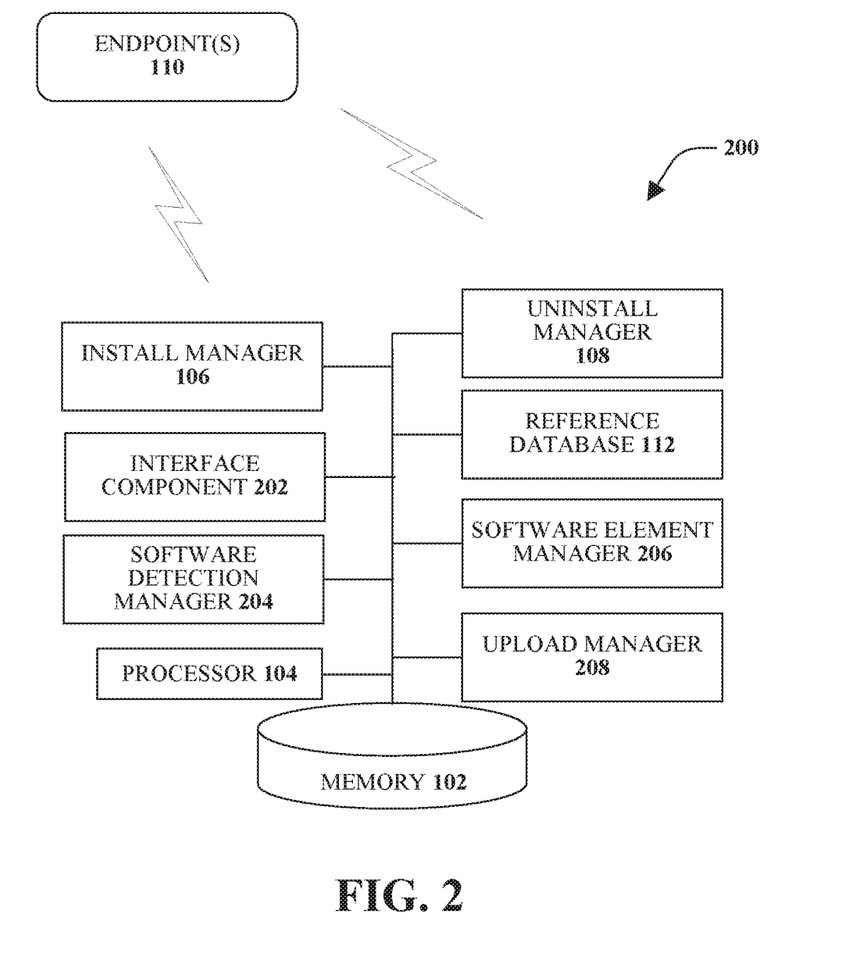
FIG. 2 illustrates an example, non-limiting system configured to uninstall software from an endpoint, according to an aspect.

FIG. 2 illustrates an example, non-limiting system 200 configured to uninstall software from an endpoint, according to an aspect. Every software installation may be reversed, such that the operating system is relived of its existence. These uninstall sequences may be easy or difficult to execute. Intimate knowledge of the artifacts placed on the endpoint is traditionally needed to ensure that the product is successfully removed. However, according to the various aspects discussed herein, the removal is rendered relatively easily by actively hunting for the software artifacts and automatically removing the artifacts. Prior knowledge of what was installed is not necessary. Further, the various aspects remove all traces of the specified software without prejudice.

The system 200 may include an interface component 202 that may be configured to receive one or more inputs from a user and/or entity. As utilized herein a user, client, customer, entity, or the like, may refer to a human, an actor, a computer, the Internet, a system (or another system), a commercial enterprise, a computer, a machine, machinery, and so forth, hereinafter referred to as a user, an operator, and/or an entity, depending on the context. For example, an operator of endpoint 110 may interact with the endpoint 110 to request deletion of a software program. The interaction at the endpoint may be through another interface component (not shown) associated with the endpoint 110. The interface component (or another component of the endpoint 110) may communicate with the interface component 202 to relay the information to the system 200.

The input may include limited information related to the software that is to be uninstalled. According to some implementations, at least a portion of a name of the software program (or the entire name) may be entered by the user. Based on this entry, a software detection manager 204 may be configured to search various information related to at least the partial name and determine whether software programs matching the partial name are installed on the endpoint 110. For example, if a software program to be removed is entitled "Ryan's Tool," a request to remove the program may include the letters "ry . . . " or "tool" and the software detection manager 204 may determine any software programs that match those letters and/or words. For example, if "ry" is entered, potential matching software programs "Ryan Tool," "Ryan Converter," "Rye Tool," and so on, may be returned. In another example, if "tool" is input, potential matching software programs, "Ryan Tool," "encryption tool," "toolbox," and so forth may be returned. The potential matching software programs returned may be presented to the user through the interface component 202 and output by the interface component (not shown) installed on the endpoint. A prompt is output for selection of the software program to be deleted.

In another example, there is an installed piece of software titled "Ryan Tool" and there are three different versions of the Ryan tool on the endpoint. Thus, when the name Ryan Tool is received, the response will indicate the three different versions. A prompt will be provided requesting selection of one of the versions in order to solidify the request. Thus, the system 200 will not just go in and remove every reference for Ryan Tool, which might impact something that is not the intended target. The different versions may be distinguished because each version is housed in different directories, subdirectories, or folders.

Thus, through the interface component 202, all products with a similar name may be presented or output at the endpoint 110. This provides the operator the ability to validate the targeted uninstall. In an example, a command line may be utilized, which may need specific information and may be used for a true hands-off approach. Thus, the uninstall manager 108 may perform an uninstall of the target program.

According to an implementation, a software element manager 206 may be configured to search for relevant environment variables, registry keys, files, folders, and so on. This information may be obtained from the reference database 112. The software element manager 206 may be configured to search the endpoint 110 to determine in any of these items exist. If found, the element(s) may be deleted to ensure a complete uninstall.

In an example, the software element manager 206 (or another system component) is harvesting the data. The data may include the native uninstall strings provided by the manufacturer, including the relevant paths and any other metadata tied to the install.

Also included in the system 200 may be an unload manager 208 that may be configured to retain a log for each uninstall attempt. The log may be maintained in the reference database 112, according to an aspect. The log may include whether the uninstall attempt was success or not successful. If the log relates to a software product for which information is not maintained in the reference database, the upload manager 208 may cause the new information to be retained in the reference database.

In some implementations, there may be various versions of software installed on the endpoint 110. Each version may have a separate uninstall package. However, with the disclosed aspects, these different uninstall packages are not needed. Instead, there is one install that is fed via a command line and it does not matter what version is being uninstalled (it only targets the specific version).

Further, if a software product is installed on the endpoint 110, the system 200 is configured to find the software product regardless of where it is located on the endpoint. Thus, the system 200 (as well as other aspects discussed herein) is a complete toolbox for any type of install or uninstall. The software product may be completely removed no matter how it was installed.

In some situations that utilize a tradition uninstall program, some uninstalls may not be complete because a module or a piece might be in use during the installation process. The disclosed aspects eliminate this problem by performing the uninstall on the fly and, further, is self-learning. After a first uninstall of the target software program, the system 200 goes through the endpoint again to check for any hooks associated with the software program.

If the system 200 does not know all the components of the software program, the system profiles the application to determine what should be included. For example, the system reviews the entire file structure, and since it knows the first structure for the different platforms, it is able to go and grab everything and remove it. With a new platform or operating system (not previously encountered) the various aspects are configured to learn and profile the endpoint to ensure that the targeted software products are removed cleanly from the endpoint.

In an example, an endpoint has a Windows™ operating system installed and the registry structure contains all the information about the install. During installation of a word processing program, for example, an uninstall commend line string or graphical user interface (GUI) is referenced for that installer. The system 200 goes into the program and references the registry to gather as much information about that install as possible. Further, the system 200 obtains the uninstall string, which may be the first item searched. Then any information relevant to the install path is logged there. It will check the registry for as much information as possible and then reference the local file structures to determine if that path is there. There are also log files for the install, which may also be referenced by the system 200. Thus, it is a comprehensive view about known locations of the artifacts of how the operating system stores the installs and a determination may be made about what should be scrubbed from the endpoint. If the system runs the command line string and most of the data in the path has been removed but the empty directory is still there, that empty directory is removed, and the registry is cleaned up.

Figure 3:
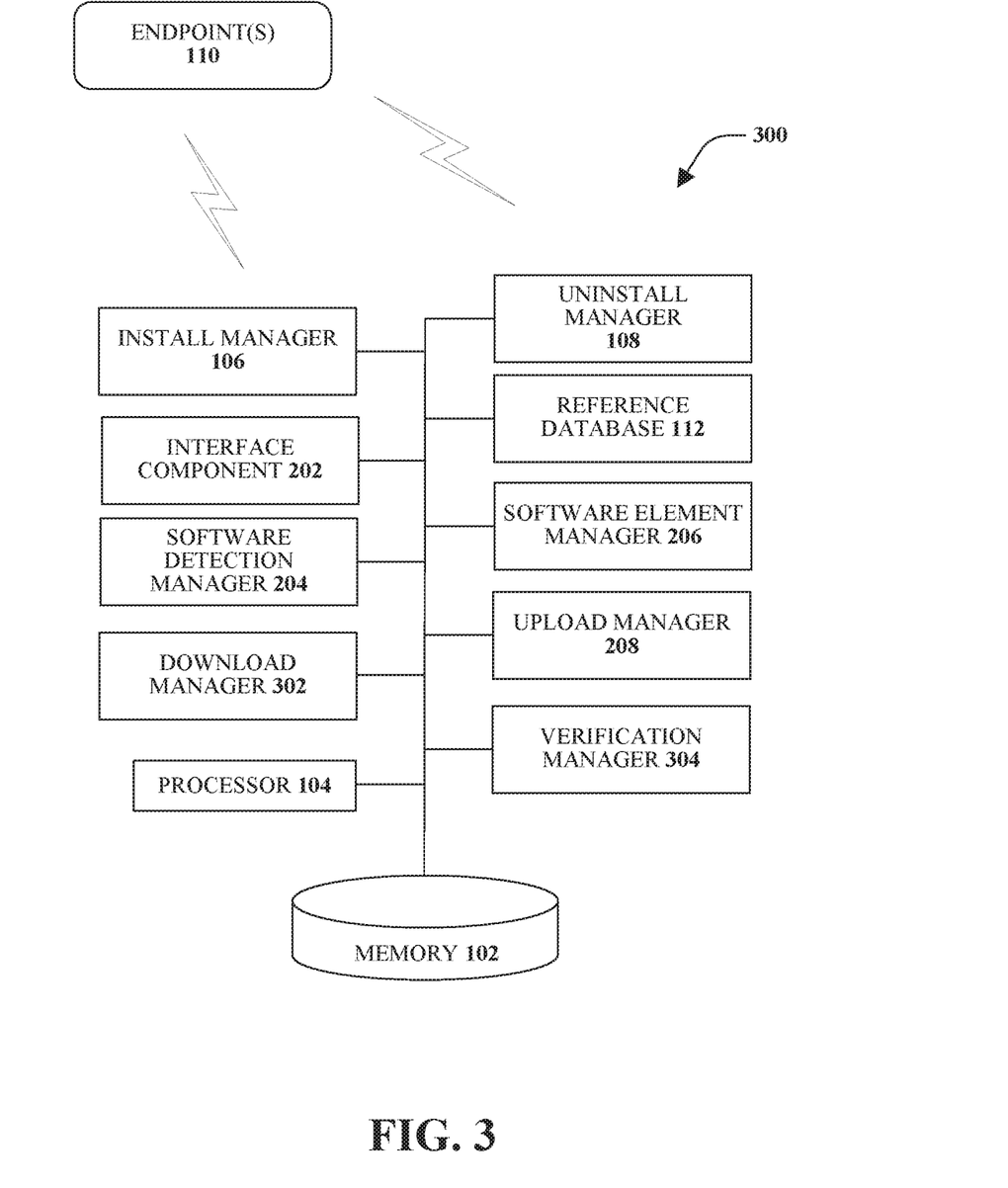
FIG. 3 illustrates an example, non-limiting system configured to install software from an endpoint, according to an aspect.

FIG. 3 illustrates an example, non-limiting system 300 configured to install software from an endpoint, according to an aspect. A challenge associated with software is corrupt installs. Sometimes the software is so corrupted that the endpoint needs to be rebuilt or reimaged, which may be performed by the disclosed aspects, which brings the endpoint back to a clean state. When the system 300 is learning, it knows what the string should be and is able to go out and find the string. For example, when a new version of an operating system is built, the system 300 searches in order to profile the operating system and includes the information in the reference database 112. Thus, the system knows how to bring the endpoint back to a clean state, as if the software product was never installed.

Further, the system 300 may be configured to ensure that installs are successful, regardless of the platform. When a request to install a software product on the endpoint 110 is received, a download manager 302 may be configured to retrieve information related to the identified software product from the reference database 112.

Similar to the request to uninstall a software product, the request to install a software product may include a partial name of the product or other identifying information. Based on this information, the download manager 302 may be configured to search the reference database 112 for one or more software products that match the partial information.

The results of the search may be output to the operator (e.g., through the interface component 202) for verification of the appropriate software product.

Based upon a confirmation of at least one software product, the reference database 112 is accessed to determine the items that should be installed by the install manager 106. After installation of the software product, a verification manager 304 may be configured to review the software product installed to determine if each item is located properly. For example, a reference point may be utilized to determine if each item is in the correct place and, if so, the installation is considered complete. This process helps eliminate the need to uninstall and reinstall the software product due to a corrupt install.

According to an implementation, when an install occurs on an endpoint, the artifacts, files, registry keys, folder structure, and so on is referenced, uploaded, and stored in the database. This is the baseline for the uninstall. At uninstall time, the agent locally at the endpoint performs a quick scan. The database, text files, and other items generated from a repository standpoint are reviewed and affiliated with the install structure for the install on the disk that occurs. This information is uploaded to the reference database 112 to help with a comprehensive uninstall.

According to some implementations, the interface component 202 (as well as other interface components discussed herein) may provide a graphical user interface (GUI), a command line interface, a speech interface, Natural Language text interface, and the like. For example, a Graphical User Interface (GUI) may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or Application Program Interface (API). In addition, the command line interface may be employed in connection with hardware (e.g., video cards) and/or displays (e.g., black and white, and Video Graphics Array (EGA)) with limited graphic support, and/or low bandwidth communication channels.

Figure 4:
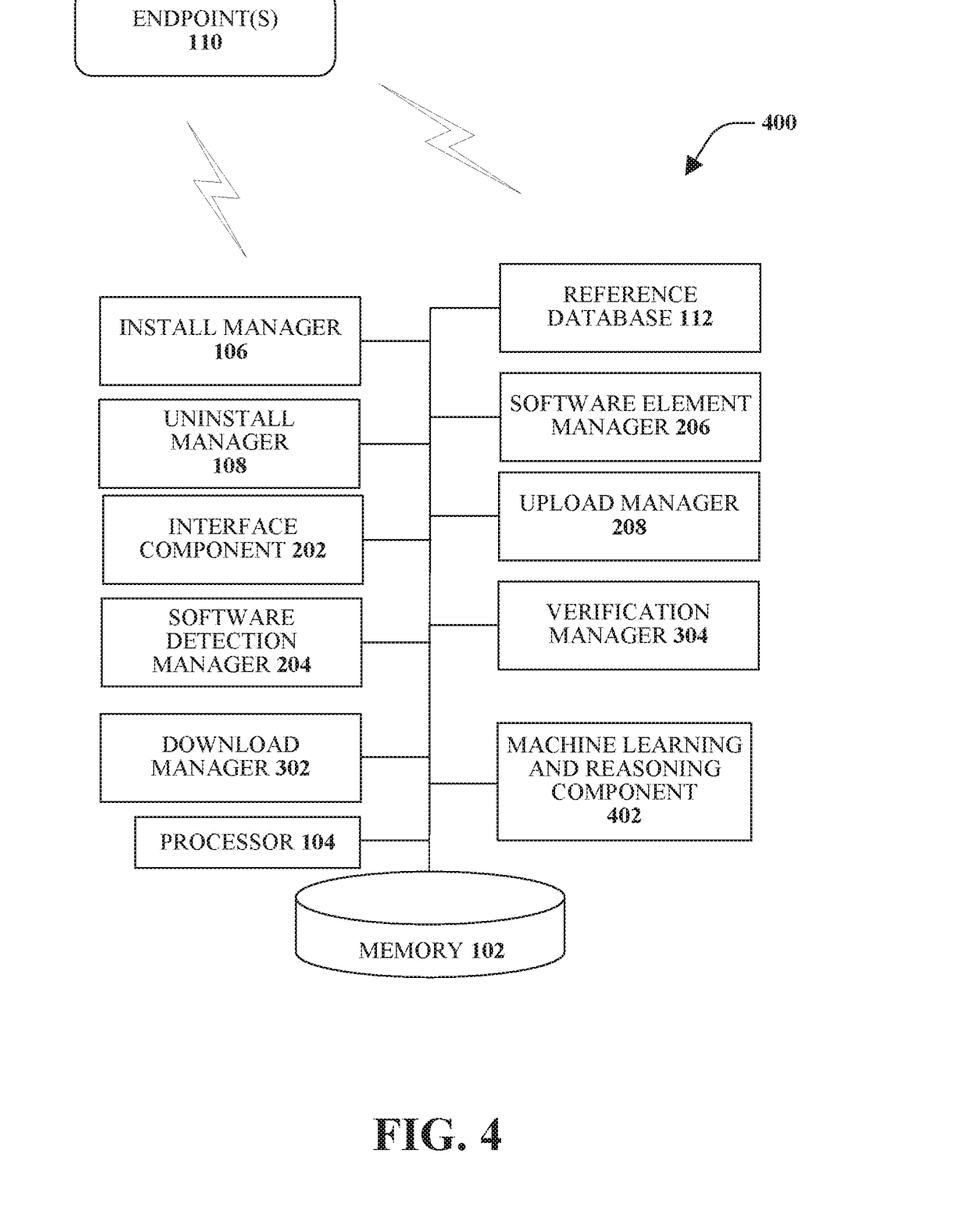
FIG. 4 illustrates an example, non-limiting system that employs automated learning to facilitate one or more of the disclosed aspects.

FIG. 4 illustrates an example, non-limiting system 400 that employs automated learning to facilitate one or more of the disclosed aspects. For example, a machine learning and reasoning component 402 may be utilized to automate one or more of the disclosed aspects. The machine learning and reasoning component 402 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 402 may employ principles of probabilistic and decision theoretic inference. Additionally, or alternatively, the machine learning and reasoning component 402 may rely on predictive models constructed using machine learning and/or automated learning procedures. Logic-centric inference may also be employed separately or in conjunction with probabilistic methods.

The machine learning and reasoning component 402 may infer which items are associated with a software product, which items are associated with two or more software products, different versions of software products installed on an endpoint, and so. Based on this knowledge, the machine learning and reasoning component 402 may make an inference based on which items to install, which items to uninstall, when to request confirmation of a software product to install and/or uninstall, and so on.

As used herein, the term "inference" refers generally to the process of reasoning about or inferring states of the system, a component, a module, the environment, and/or a software product from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with facilitating a clean uninstall of a software product and/or a successful install of a software product) may employ various artificial intelligence-based schemes for carrying out various aspects thereof. For example, a process for determining what items should be installed, which items should be uninstalled, and so on, may be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification may employ a probabilistic and/or statistical-based analysis (e.g., factoring into the analysis utilities and costs) to prognose or infer an action that should be employed to determine what items are related to a software product, which software products are installed on an endpoint, which software product should be uninstalled from the endpoint, and so on. In the case of software products, for example, attributes may be a name of a software product and the classes may be identification of items associated with the software product. The items may include an environment variable, a registry key, a file, a folder, or combinations thereof.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing node behavior, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria which items are related to a software product based on historical data, a previous install, a previous uninstall, and so forth. The criteria may include, but is not limited to, received information, historical information, current information, software product attributes, and so forth.

Additionally, or alternatively, an implementation scheme (e.g., a rule, a policy, and so on) may be applied to control and/or regulate which items should be installed/uninstalled for a particular software product. In some implementations, based upon a predefined criterion, the rules-based implementation may automatically and/or dynamically interpret attributes associated with a software product. In response thereto, the rule-based implementation may automatically interpret and carry out functions associated with the software product by employing a predefined and/or programmed rule(s) based upon any desired criteria.

Methods that may be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 5:
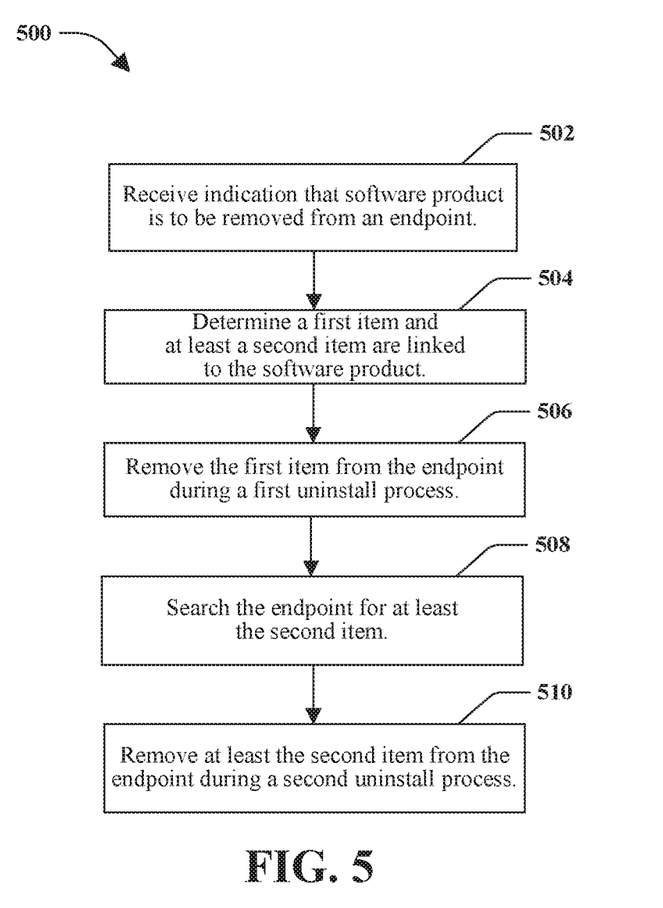
FIG. 5 illustrates an example, non-limiting method for universal uninstall, according to an aspect.

FIG. 5 illustrates an example, non-limiting method 500 for universal uninstall, according to an aspect. The method 500 in FIG. 5 may be implemented using, for example, any of the systems, such as the system 200 (of FIG. 2), described herein. Problems faced by engineers is the removal of software that has been installed on workstations or endpoints. The various aspects discussed herein relates to the clean removal of software, not just its removal (which may leave residual artifacts behind).

Software manufacturers perform software installs and provide proper logging and exit codes. When the software is to be removed, there is no mechanism, even using the native uninstall technologies that would be referenced during uninstall, that cleanly removes the software. This may be because there are items or components in use, or that are added, and the native uninstaller might not account for this data that is left behind. The various aspects provided herein provide a mechanism to automate the uninstall of software on any platform (platform agnostic) by just providing some information about the install that is being targeted.

The method 500 starts, at 502, when an indication that a software product is to be removed from an endpoint is received (e.g., utilizing the interface component 202). The indication may include receiving at least a portion of a file name for the software product. Based on this information, a list of software products that match at least the portion of the file name are output and a validation of the software product may be received. For example, a user may select one of the software products included in the list of software products for uninstall.

At 504, a first item and at least a second item linked to the software product selected are determined (e.g., using the software element manager 206). The first item and at least the second item are installed on the endpoint. The first item and/or at least the second item may include an environment variable, a registry key, a file, a folder, or combinations thereof.

According to an implementation, determining the first item and at least the second item linked to the software product may include accessing an uninstall string for the software product. Alternatively or additionally, the determination may include accessing a reference database that includes information related to known software products (e.g., software products that were installed on the endpoint or other endpoints, software products that were uninstalled from the endpoint or other endpoints, and so on).

The first item is removed from the endpoint (e.g., using the uninstall manager 408) during a first uninstall process, at 506. After the first uninstall process, at 508, the endpoint is searched (e.g., using the software element manager 206) for at least the second item. For example, the search may be utilized to determine if there are any items that were not removed during the first uninstall process. According to an implementation, the searching may include determining an artifact of the software product remains installed on the endpoint (e.g., was not properly removed during the first uninstall process).

At 510, at least the second item is removed from the endpoint (e.g. using the uninstall manager 208) during a second uninstall process. Removing at least the second item may include removing an empty directory related to the software product. Additionally, or alternatively, removing at least the second item may include removing artifacts of the software product that were not removed during the first uninstall process.

According to an implementation, the method may include organizing a registry to reflect removal of the software product. Additionally, or alternatively, the method may include updating a reference database with information related to the first item and at least the second item linked to the software product.

Figure 6:
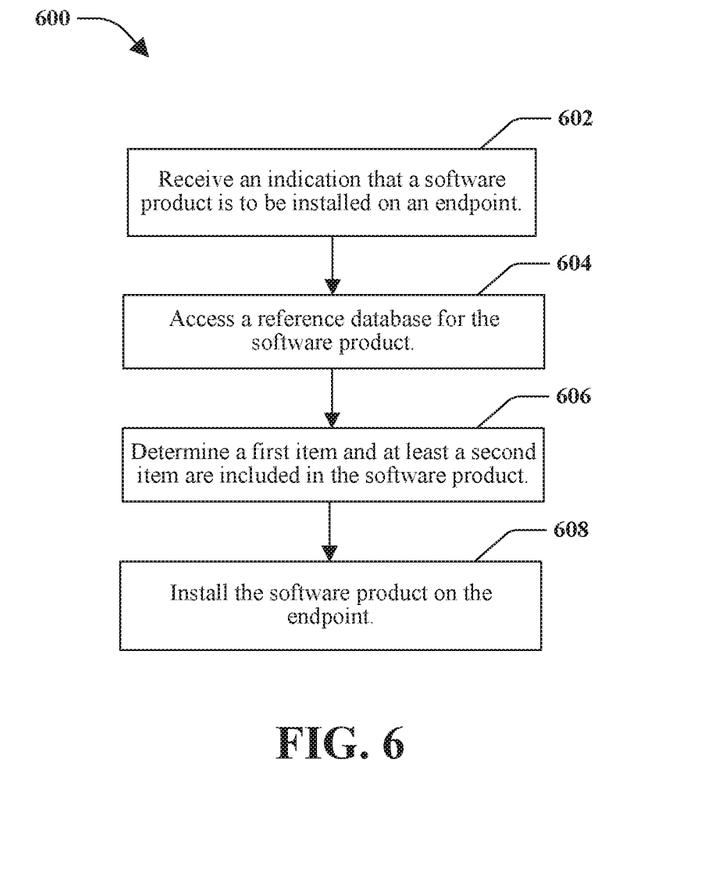
FIG. 6 illustrates an example, non-limiting method for universal install, according to an aspect.

FIG. 6 illustrates an example, non-limiting method 600 for universal install, according to an aspect. The method 600 in FIG. 6 may be implemented using, for example, any of the systems, such as the system 300 (of FIG. 3), described herein.

The method 600 starts at 602 when an indication of a software product to be installed on an endpoint is received (e.g., utilizing the interface component 202). The indication may be receipt of at least a portion of a file name for the software product. A list of software products that include at least the portion of the file name or a similar file name may be output or presented to the user. A validation of the software product, selected from the list of software products may be received (before a software product is installed, or uninstalled).

At 604, a reference database is accessed (e.g., using a software detection manager 204) and, at 606, a determination of items associated with the selected software product (e.g., using the software element manager 206) is determined. The items may include a registry key, a file, a folder, or combinations thereof. The reference database may include information related to different software products and may retain this information based on previous installs and/or uninstall and regardless of the operating system platform (e.g., platform agnostic).

The software product is installed, at 608 (e.g., utilizing the install manager 206). Further, a verification that all items associated with the software product may be performed after the install. If the items are located correctly, the install is complete. If one or more items are not located correctly, a change is made to locate the item appropriately.

Figure 7:
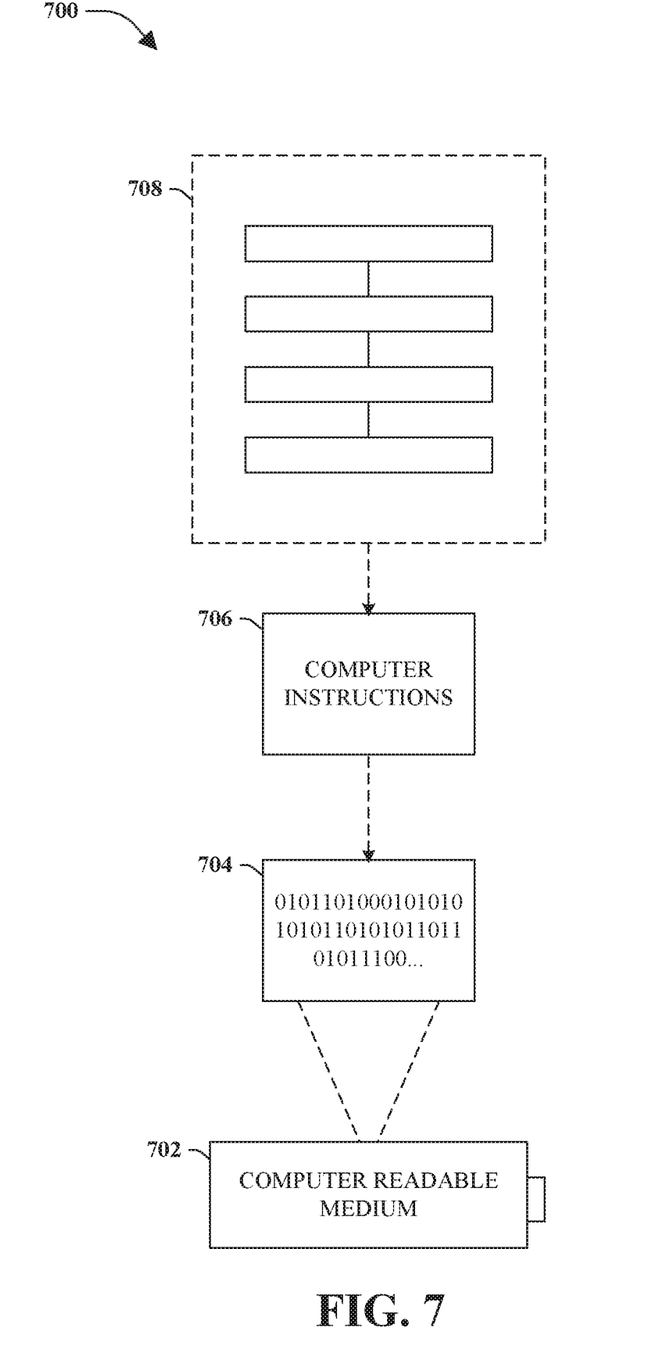
FIG. 7 illustrates an example, non-limiting computer-readable medium or computer-readable device including processor-executable instructions configured to embody one or more of the aspects set forth herein.

One or more implementations include a computer-readable medium including microprocessor or processor-executable instructions configured to implement one or more embodiments presented herein. As discussed herein the various aspects relate to a universal software installer and/or a universal software uninstaller. An embodiment of a computer-readable medium or a computer-readable device devised in these ways is illustrated in FIG. 7, wherein an implementation 700 includes a computer-readable medium 702, such as a CD-R, DVD-R, flash drive, a platter of a hard disk drive, and so forth, on which is encoded computer-readable data 704. The computer-readable data 704, such as binary data including a plurality of zero's and one's as illustrated, in turn includes a set of computer instructions 706 configured to operate according to one or more of the principles set forth herein.

In the illustrated embodiment 700, the set of computer instructions 706 (e.g., processor-executable computer instructions) may be configured to perform a method 708, such as the method 500 of FIG. 5 and/or the method 600 of FIG. 6, for example. In another embodiment, the set of computer instructions 706 may be configured to implement a system, such as the system 100 of FIG. 1 and/or the system 400 of FIG. 4, for example. Many such computer-readable media may be devised by those of ordinary skill in the art that are configured to operate in accordance with the techniques presented herein.

As used in this application, the terms "component," "module," "system," "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 7 and the following discussion provide a description of a suitable computing environment to implement embodiments of one or more of the aspects set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions is combined or distributed as desired in various environments.

Figure 8:
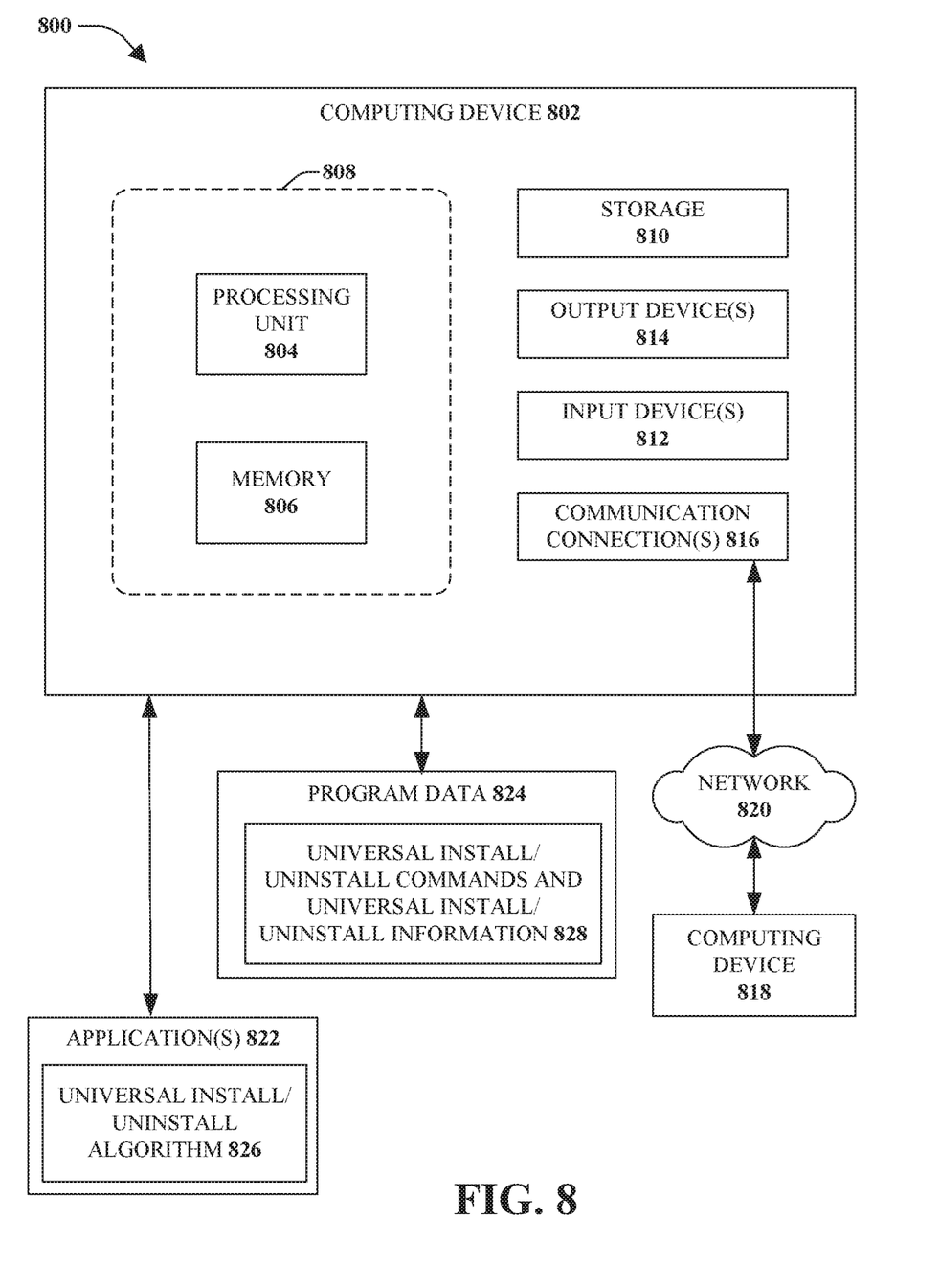
FIG. 8 illustrates an example, non-limiting computing environment where one or more of the aspects set forth herein are implemented, according to one or more aspects.

FIG. 8 illustrates a system 800 that may include a computing device 802 configured to implement one or more embodiments provided herein. In one configuration, the computing device 802 may include at least one processing unit 804 and at least one memory 806. Depending on the exact configuration and type of computing device, the at least one memory 806 may be volatile, such as RAM, non-volatile, such as ROM, flash memory, etc., or a combination thereof. This configuration is illustrated in FIG. 8 by dashed line 808.

In other embodiments, the computing device 802 may include additional features or functionality. For example, the computing device 802 may include additional storage such as removable storage or non-removable storage, including, but not limited to, magnetic storage, optical storage, etc. Such additional storage is illustrated in FIG. 8 by storage 810. In one or more embodiments, computer readable instructions to implement one or more embodiments provided herein are in the storage 810. The storage 810 may store other computer readable instructions to implement an operating system, an application program, etc. Computer readable instructions may be loaded in the at least one memory 806 for execution by the at least one processing unit 804, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries, or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 802 may include input device(s) 812 such as keyboard, mouse, pen, voice input device, touch input device, infrared cameras, video input devices, or any other input device. Output device(s) 814 such as one or more displays, speakers, printers, or any other output device may be included with the computing device 802. The input device(s) 812 and the output device(s) 814 may be connected to the computing device 802 via a wired connection, wireless connection, or any combination thereof. In one or more embodiments, an input device or an output device from another computing device may be used as the input device(s) 812 and/or the output device(s) 814 for the computing device 802. Further, the computing device 802 may include communication connection(s) 816 to facilitate communications with one or more other devices, illustrated as a computing device 818 coupled over a network 820.

One or more applications 822 and/or program data 824 may be accessible by the computing device 802. According to some implementations, the application(s) 822 and/or program data 824 are included, at least in part, in the computing device 802. The application(s) 822 may include a universal install/uninstall algorithm 826 that is arranged to perform the functions as described herein including those described with respect to the system 300 of FIG. 3. The program data 824 may include universal install/uninstall commands and universal install/uninstall information 828 that may be useful for operation with the various aspects as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

A device may also be called, and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
a processor coupled to a memory that includes instructions that, when executed by the processor, cause the processor to:
determine that a software product has been partially uninstalled from an endpoint by a first uninstall process;
search for a registry key of the partially uninstalled software product that remains on the endpoint after execution of the first uninstall process;
apply a probabilistic or statistic-based inference to determine that the registry key remains from the partially uninstalled software product after execution of the first uninstall process, wherein applying the probabilistic or statistic-based inference comprises:
identifying an operating system of the endpoint; and
identifying an item as the registry key of the partially uninstalled software product by using a trained machine-learning classifier to determine a probability that the item remains from an installation of the software product on the operating system of the endpoint, wherein the machine-learning classifier is trained using historical installation and uninstallation data of the software product on multiple endpoints to determine a probability that a target item remains from a previous installation; and
execute a second uninstall process to remove the registry key remaining from the partially uninstalled software product after execution of the first uninstall process.

2. The system of claim 1, wherein the instructions further cause the processor to search the endpoint based on a profile of the endpoint, wherein the profile captures information regarding an uninstall on at least one other endpoint.

3. The system of claim 2, wherein the other endpoint executes on a different platform than the endpoint.

4. The system of claim 1, wherein the instructions further cause the processor to update with the registry key a profile of at least one of the endpoint or the partially uninstalled software product.

5. The system of claim 1, wherein the instructions further cause the processor to identify the software product based on received user input.

6. The system of claim 1, wherein the instructions further cause the processor to trigger removal of the registry key if the probability exceeds a threshold.

7. The system of claim 1, wherein applying the probabilistic or statistic-based inference to determine that the registry key remains from the partially uninstalled software product after execution of the first uninstall process comprises:
determining, based on a file structure of an operating system of the endpoint, one or more artifacts included in an installation of the software product; and
identifying the registry key as being among the one or more artifacts that are included in the installation of the software product.

8. A method, comprising:
determining that a software product has been partially uninstalled from an endpoint by a first uninstall process;
searching an endpoint for a registry key of the partially uninstalled software product that remains on the endpoint after execution of an initial uninstall process to remove the software product from the endpoint;
applying a probabilistic or statistic-based inference to determine that the registry key remains from the partially uninstalled software product after execution of the initial uninstall process, wherein applying the probabilistic or statistic-based inference comprises:
identifying an operating system of the endpoint; and
identifying an item as the registry key of the partially uninstalled software product by using a machine-learning classifier to determine a probability that the item remains from an installation of the software product on the operating system of the endpoint, wherein the machine-learning classifier is trained using historical installation and uninstallation data of the software product on multiple endpoints to determine a probability that a target item remains from a previous installation; and automatically executing a second uninstall process to remove the registry key of the partially uninstalled software product from the endpoint, based on the registry key remaining from the partially uninstalled software product.

9. The method of claim 8, further comprising searching the endpoint based on a profile of the software product.

10. The method of claim 8, further comprising searching the endpoint based on a profile of the endpoint.

11. The method of claim 8, further comprising updating a profile associated with the software product or endpoint with the registry key.

12. The method of claim 8, further comprising triggering removal of the registry key if the probability is greater than a threshold value.

13. The method of claim 8, further comprising searching for an additional registry key based on the registry key.

14. A non-transitory computer-readable storage medium that stores executable instructions that, in response to execution by a processor, cause the processor to perform operations, comprising:

determining that a software product has been partially uninstalled from an endpoint by a first uninstall process;

searching an endpoint for registry key of the partially uninstalled software product that remains on the endpoint after execution of an initial uninstall process to remove the software product from the endpoint;

applying a probabilistic or statistic-based inference to determine that the registry key remains from the partially uninstalled software product after execution of the initial uninstall process, wherein applying the probabilistic or statistic-based inference comprises:

identifying an operating system of the endpoint; and identifying an item as the registry key of the partially uninstalled software product by using a machine-learning classifier to determine a probability that the item remains from an installation of the software product on the operating system of the endpoint, wherein the machine-learning classifier is trained using historical installation and uninstallation data of the software product on multiple endpoints to determine a probability that a target item remains from a previous installation; and automatically executing a second uninstall process to remove the registry key of the partially uninstalled software product from the endpoint, based on the registry key remaining from the partially uninstalled software product.

15. The non-transitory computer-readable storage medium of claim 14, the operations further comprising searching for the registry key based on a profile associated with at least one of the endpoint and the software product.

16. The non-transitory computer-readable storage medium of claim 14, the operations further comprising updating a profile associated with at least one of the software product or endpoint with the registry key.

\* \* \* \* \*